United States Patent [19]

Rucki

[11] Patent Number: 4,680,508
[45] Date of Patent: Jul. 14, 1987

[54] LOAD CONTROL CIRCUIT

[75] Inventor: William M. Rucki, Euclid, Ohio

[73] Assignee: General Electric Company, Schenectady, N.Y.

[21] Appl. No.: 861,675

[22] Filed: May 9, 1986

[51] Int. Cl.$^4$ ............................................. H05B 37/00
[52] U.S. Cl. ...................................... 315/166; 315/243; 315/244; 315/DIG. 4; 315/DIG. 7
[58] Field of Search ................. 315/165, 166, DIG. 4, 315/DIG. 7, 243, 244

[56] References Cited

U.S. PATENT DOCUMENTS

| | | | |
|---|---|---|---|
| 4,359,670 | 11/1982 | Hosaka et al. | 315/DIG. 4 |
| 4,392,086 | 7/1983 | Ide et al. | 315/DIG. 4 |
| 4,479,215 | 10/1984 | Baker | 371/33 |
| 4,604,552 | 8/1986 | Alley et al. | 315/DIG. 4 |
| 4,612,479 | 9/1986 | Zansky | 315/DIG. 4 |

Primary Examiner—Harold Dixon
Attorney, Agent, or Firm—Nathan D. Herkamp; Philip L. Schlamp; Fred Jacob

[57] ABSTRACT

An electrical load controller includes a combination of switches for selecting a desired load output level, an electronic custom gate array for converting the switch signals to a parallel binary number, a parallel to serial data encoder for converting the multi-bit parallel data signal into a multi-bit serial data signal, a frequency shift key connected to a resonant circuit generating a controllable high frequency signal and for shifting the high frequency either up or down from the center frequency coupled to a power line to transmit the binary serial data onto the power line. The system also includes a fail-safe construction so that, should the control system fail, the load will be operable. The system provides continuous communication from the controller to the power line, so that should noise interfere with one data transmission, subsequent data transmission will provide correct data to the load, thereby making load control nearly immune to extraneous noise on the power line.

15 Claims, 6 Drawing Figures

TRANSMIT ENABLE

ENCODER OSCILLATOR (PIN 12)

DATA OUT (PIN 15)

LOAD CONTROL CIRCUIT

BACKGROUND OF THE INVENTION

1. Field of the Invention

The present invention relates to a control circuit for an electrical power supply system and, more particularly, to a system for supplying control signals to fluorescent lamp load using the power line as the signal carrier.

2. Description of the Prior Art

In the prior art, load control such as dimming fluorescent lamps has normally been accomplished by some control circuit which chops the power supply wave to reduce the total amount of energy delivered to the lamp. The prior self-contained wall mounted dimmers and controllers have employed phase control for dimming which results in reduced power capability. Phase control is often accomplished using a triac which dissipates very large amounts of power at high currents, which requires the dimmers to be derated to typically 600 to 1,000 watts. This limits the number of fluorescent lamp ballasts which can be controlled by a single switch to that number making up the maximum wattage rating of the controller.

3. Summary of the Invention

An object of the present invention is to provide a load controller which utilizes the power line as the communication signal carrier. A more specific object of the present invention is to provide a load control system in which a single controller is capable of controlling all loads on the power line connected to a particular branch without dissipating significant power in the controller. A still more specific object of the present invention is to provide a system employing a frequency modulated signal superimposed upon the power signal to provide a reliable dimming control signal for fluorescent lamp ballasts. Yet another object of the present invention is to provide a redundant signalling controller which continuously transmits control signals on the power line so that the effect of noise upon the control transmission is suppressed.

Accordingly, the present invention includes a plurality of input switches for selecting a desired load level, an electronic gate array for converting the switch positions to a binary control number dependent upon the combination of switch closures detected by the gate array, an integrated circuit device for converting the output of the gate array from a parallel multi-bit data word to a serial multi-bit data word, transmitting means for providing a high-frequency signal to the power line having a frequency dependent upon the data word, and a filter circuit for blocking transmission of the high frequency signal upstream onto the power supply system. In a particular preferred embodiment to the present invention a master on/off switch is connected to a normally on relay to provide a failsafe circuit arrangement, so that in the event of controller failure all power is maintained on at the previously chosen level and is turned on to maximum output on turn on after a controller failure.

BRIEF DESCRIPTION OF THE DRAWINGS

Further objects and advantages of the present invention, together with it's organization, method of operation and best mode contemplated may best be understood by reference to the following description taken in conjunction with the accompanying drawings in which.

DESCRIPTION OF THE PREFERRED EMBODIMENTS

Figure 1:
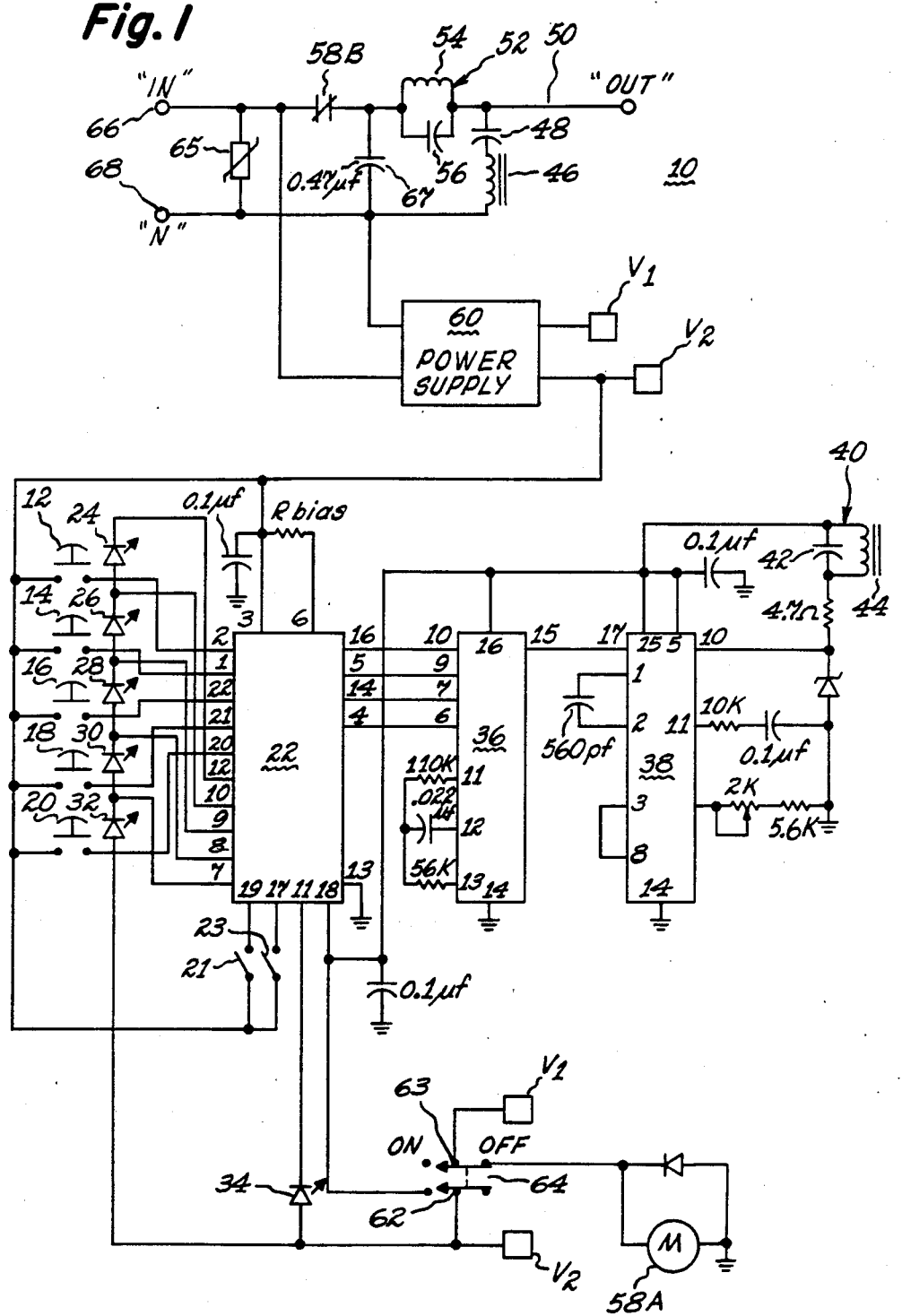
FIG. 1 is a schematic circuit diagram illustrating the load controller circuit of the present invention.

In a preferred embodiment of the present invention the control circuit comprises the fluorescent lamp dimming controller 10 as illustrated in FIG. 1 including a plurality of manually settable switches 12, 14, 16, 18 and 20 for selecting a desired one of a plurality of predetermined light output levels for fluorescent lamps connected to the controller. The switches 12–20 provide signals to a custom gate array 22. The gate array 22 provides output signals to light selected ones of light emitting diodes (LEDs) 24, 26, 28, 30 and 32 which correspond respectively to the switches 12–20 so that all of the LEDs up to and including the one adjacent the switch activated by the user are lighted to provide a bar graph indicator to indicate to the user the light level selected. The custom gate array 22 also includes a programable read only memory providing a look-up table so that the selected positions of switches 12–20 are converted into a multibit binary number which is provided as an output signal to a parallel to serial data encoder 36. A pair of scaling light level switches 21, 23 allow the selection of scaling light levels for the switches 12–18. The minimum light level selected by switch 20 will be unaffected by the selection of scaling by the switches 21, 23. However, the remaining switches are scaled by the gate array 22 so that the light output level is reduced in approximately equal steps as shown in Table 1.

| Hexadecimal Code Transmitted Dimmer Button Depressed | | | | | |
|---|---|---|---|---|---|
| | 12 | 14 | 16 | 18 | 20 |
| Scaling Input Selected (Switches 21, 23) | | | | | |
| 100% | 0 | 0 | 3 | 6 | A | F |
| 90% | 1 | 2 | 5 | 8 | B | F |
| 80% | 2 | 4 | 6 | 9 | C | F |
| 70% | 3 | 5 | 8 | A | C | F |

The percentages 70% to 100% are arbitrarily selected to be those desired as maximum light levels. Other levels could be selected as the maximum outputs with the appropriate scaling of dimming values. The hexadecimal codes indicated range from 0 to F (0–15) and are stored in a programmable read only memory (PROM) on the custom gate array 22. The switches 21, 23 allow the selection of four scaling choices. As will be understood by those skilled in the art, the number of available scaling choices can be increased or decreased by adding or deleting scaling switches. The minimum light level selected by switch 20 is programmed to be the same F for all scaling values as shown in the table. For each of the scaling values selected the dimmer buttons 12–18 will cause transmission of the hexadecimal value shown in Table 1 as the four bit binary output signal from gate array 22. It will be noted that the differences in binary values do not vary linearly between each successive pair of dimmer buttons. This is due to the nonlinearity of light output of fluorescent lamps versus voltage across the lamp load. The values shown in Table 1 are those determined for a ballast circuit for a fluorescent lamp load including three series connected T-8 (one inch diameter) fluorescent lamps as described in the U.S. patent application Ser. No. 861,907 of Sam W. Hussey filed concurrently herewith and assigned to the assignee of the present application. The hexadecimal values would be different for a different electrical load, but the system and control process disclosed herein would be applicable for controlling such other loads. The PROM within gate array 22 will control the output to produce visually apparent light intensity steps taking into account the nonlinearity of a fluorescent lamp load. Data encoder 36 translates the four-bit parallel binary word into a four-bit serial binary data sequence. The serial binary data is provided to a frequency shift key 38 which provides an output signal which controls frequency of the resonant tank circuit 40 comprising the capacitor 42 and inductor 44. The capacitance value of capacitor 42 and inductance value of inductor 44 are selected so that the tank circuit 40 will resonate at a center frequency of about 125 kilohertz plus or minus about 2½ percent as controlled by the data sequence in the serial data word. The inductor 44 of the tank circuit is coupled to the inductor 46 in the output circuit which provides the high frequency signal via capacitor 48 to the output line 50 supplying power to the fluorescent lamp ballasts. A filter circuit 52 coupled to a relay 58, to be described, comprises inductor 54 and capacitor 56 having values selected to be resonant at the control signal frequency, e.g. 125 KHz, so that the filter 52 blocks transmission of the high frequency signal upstream on (i.e. toward the power signal generator) on the power line. The system also includes power supply 60 for supplying a regulated signal V2, e.g. a 15 volt d-c voltage signal, to pin 3 of the custom gate array 22 so that gate array 22 has a continuous power supply for retaining its last output setting in memory. The power supply output V2 is also connected to the input side of switches 12-20, 21 and 23, and to the LEDs 24-34. The output V2 is also connected to the terminal 62 of on-off switch 64 so that when switch 64 is closed, the voltage V2 is supplied to pin 18 of custom gate array 22, pin 16 of encoder 36 and pins 5 and 15 of frequency shift key 38. The present invention also provides a fail safe mode so that, if the controller fails when the system is transmitting control signals no change in illumination will occur until the switch 64 controlling relay 58, is turned off. Relay 58 comprises an energizing coil 58A and normally closed contacts 58B. The energizing coil 58A is energized by way of the off position of switch 64. When switch 64 is turned on after a failure, the full intensity illumination signal will be automatically transmitted until the switch 64 is turned off or until the failure has been corrected. The relay 58 is operable by switch 64 regardless of the status of the control circuit, so that if the control circuit fails, relay 58 operates as a normal on-off relay. This will cause the lamp load to go to full intensity output, so light is always available.

Figure 2A:
FIGS. 2a, 2b, 2c are schematic timing diagrams illustrating the control signals generated by the circuit illustrated in FIG. 1.
Figure 2B:
Figure 2C:
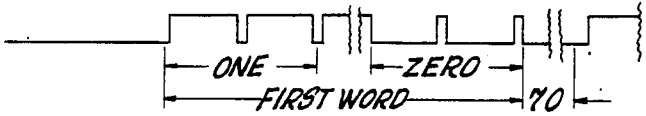
Figure 3:
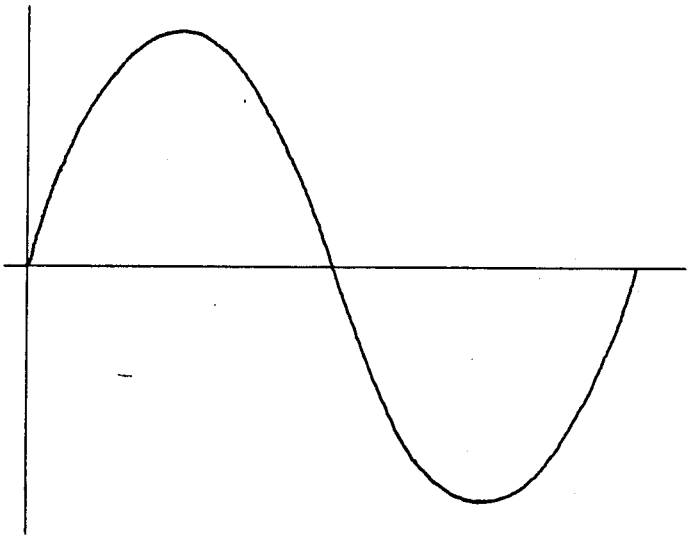
FIG. 3 is a schematic diagram showing the power line carrier wave having a high frequency signal superimposed thereon.
Figure 4:
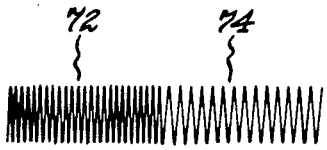
FIG. 4 is a schematic view of a portion of the wave shown in FIG. 3 on a much enlarged scale.

The circuit of the present invention operates as follows: When power is applied, for example, from a 277 volt a-c input power line, to the input terminals 66 and 68 preferably having connected across the terminals a standard surge suppressor 65 and a filter capacitor 67 with a typical value of 0.47 microfarads, power supply circuit 60 provides a regulated output signal V2 to light LED 34 and to maintain the memory of the PROM on custom gate array 22, and an unregulated output signal V1 to switch 64 to maintain power on the coil of relay 58 to hold the relay contacts open. When the switch 64 is closed voltage: V2 is applied at pin 18 of gate array 22, pin 16 of encoder 36 and pins 5 and 15 of frequency shift key 38. The switches 21, 23 are set at desired positions to select the scaling pattern for light output level for the gate array 22. The switches 12-20 may then be activated by the system user to cause a control signal to be provided to the gate array 22 via pins 2, 1, 22, 21, 20. Gate array 22 provides output signals via pins 7, 8, 9, 10 and 12 to LEDs 24-32 to light the LEDs indicating which of switches 12-20 was activated. In the preferred embodiment for any level of illumination all lower level indicating LEDs are lighted as well as the LED associated with the selected switch to provide a bar graph type of indication of the selected level. Gate array 22 provides via pins 4, 14, 5, 16 a parallel multi-bit output signal from the look-up table stored in its PROM as shown in Table 1 indicative of the selected one of switches 12-20 closed to the input pins 6-10 of parallel to serial data encoder 36. The encoder 36 is a commercially available chip, for example an MC 145026 sold by Motorola, Inc., which translates the parallel data to a serial data word and provides a signal to the frequency shift key 38, a binary control commercially available chip sold by National Semiconductor, Inc. as part number LM1893. A transmit enable pulse as shown in FIG. 2a is transmitted at the instant of turn on due to the connection of pin 14 of encoder 36 to electrical ground. This also ensures continuous transmission of the control signal because the circuit is always enabled to transmit the last selected signal. The encoder 36 includes an oscillator circuit providing the timing waveform shown in FIG. 2b, typically 360 hertz set by the RC circuit connected at pins 11, 12 and 13 of encoder 36. The input from custom gate array 22 is translated by the encoder 36 into a nine bit word comprising a series of 37 1"s and "0"s as shown in FIG. 2c. A "1" is represented by a pair of high pulses of 3½ oscillatory clock pulse widths separated by a low pulse of ½ oscillator clock pulse width, and a "0" is represented by a pair of low pulses of 3½ clock pulse widths separated by a high pulse of ½ clock pulse width as shown in FIG. 2c. Encoder 36 transmits a five bit address and a four bit data word which requires ten address pulse periods (4 oscillator cycles each) and eight data pulse periods followed by a deadtime 70 of three data bit periods and then the next data transmission. In the present invention the address code is set to a single predetermined address so that all loads on the line receive the same instruction. The encoder 36 is a chip which has the capability of transmitting a third state, "open", but this state is not used in the present invention. The frequency shift key 38 is tuned by selection of the values of the components connected at pins 1 and 18 to control the resonant frequency of tank circuit 40, so that when a binary "1" is supplied to the frequency shift key 38, the frequency shift key 38 shifts up the resonant frequency of tank circuit 40 in combination with the frequency shift key 38, and when a "0" is supplied to the frequency shift key, the frequency of the tank circuit is shifted down from the resonant circuit center frequency. The frequency shift is approximately 2½ percent up or down from the center frequency. In a 125 KHz circuit the shift is about ±3 Khz. When this frequency modulated signal shown in FIG. 4 is superimposed on a 60 Hz power line signal the resulting waveform is as represented in FIG. 3. In FIG. 3 the signal appears as a "fuzzy" sine wave having an amplitude of about 391 volts with a high frequency signal having an amplitude of about 1 to 2 volts superimposed. In the enlargement shown in FIG. 4, it is clear that the frequency modulation carried by the power signal provides a binary "1" having a frequency of about 127.5 KHz shown at 72 and "0" of about 122.5 KHz shown at 74.

The control signal will be received by any receiver capable of detecting, decoding and responding to the signal, for example, as described in U.S. patent application Ser. No. 861,907 filed by Sam Hussey on the same date as the present case and assigned to the assignee of the present case. If loads such as electromagnetic lamp ballasts lacking the circuitry to detect and act on the data signals are on the line, no effect of the control signal upon those ballasts occurs, because the high frequency signal is too small as compared to the power signal to effect the power delivered. If the dimming control circuit fails and stops transmitting continuous control signals, no further control data can be transmitted on the line. After the line is again turned on the entire branch line is raised to full light output by the fact that the normally closed relay 58 remains closed, but no control signal causing a less than full output will be provided for inductor 46 for application to the line 50 by applying the control signals to the line as described herein. With the normally closed relay 58 present, the invention allows fail-safe operation, in that failure of the control signal generator will not interrupt the transmission of the power signal from the input 66 to the output line 50, because the presence or absence of the control signal leaves the power signal essentially unaffected as shown in FIG. 3. The continuous transmission of data makes the system noise tolerant, because a signal distorted or destroyed by noise will be followed by a correct transmission of the proper data as soon as the noise is removed. The high frequency signal is prevented from being transmitted upstream into the power source system by tank circuit 52 which is tuned to the center frequency of the a-c communication signal to suppress control signals or noise from reaching the power system at the communication frequency from being transmitted onto the load line and interfering with the power supply system. Inductor 44 is coupled to the output inductor 46 for providing the frequency modulated control signal to the power line 50 carrying the digital control data to the load, e.g. fluorescent lamp ballasts. The data will be detected by a detector circuit in the load circuit for controlling the characteristic affected by the data transmission; in particular the light intensity level of the fluorescent lamps connected to the power system of the present invention. Other types of electrical loads may be similarly controlled by selection of a control parameter and a data array for storage in the PROM of the custom gate array.

As will be appreciated by those skilled in the art the present invention provides a control signal generating system for applying predetermined control signals to a power line carrier without deleteriously affecting the power carrier and allowing user selection of control parameters for multiple loads from a single control input while maintaining high efficiency of the controlled power supply system.

I claim:

1. A control circuit for controlling the electrical power supplied by an a-c power supply line at a first predetermined frequency; said control circuit comprising:
   electronic data storage means connected electrically in series in said power line for controlling the supplying of electrical power downstream at least one electrical load;
   electronic data storage means for storing a plurality of predetermined load control data;
   manually operable means for selecting one of said plurality of predetermined load control data for application of said power supply line;
   control signal encoding means for converting said one of a plurality of load control data to a data signal; and
   transmitter means for transmitting said data signal at a second predetermined frequency substantially different from said first predetermined frequency to said power supply line.

2. The invention of claim 1 wherein said manually operable means comprises:
   a plurality of input switch means each connected to said electronic data storage means for providing one of a plurality of data retrieval signals to said data storage means for causing said data storage means to retrieve a predetermined one of said load control data upon operation of a predetermined one of said switch means.

3. The invention of claim 2 wherein said electronic data storage means comprises:
   electronic means for receiving said data retrieval signals and outputting a multiple bit parallel data signal having a binary value dependent upon the data retrieval signal received.

4. The invention of claim 3 further comprising:
   a plurality of indicator means associated with respective ones of said input switch means for indicating the on-off status of said respective ones of said input switch means.

5. The invention of claim 4 wherein said data storage means comprises custom gate array means comprising:
   programmable read only memory means for storing said predetermined data values and outputting said predetermined values when accessed by said input switch means;
   switch logic and sequence control means for receiving said input control signals and converting said input control signals into programmable read only memory address codes;
   indicator driver means for supplying activation signals to said indicator means dependent upon the input switch means activated; and
   output means for outputting said data values.

6. The invention of claim 4 wherein said indicator means comprises:
   a plurality of light emitting diodes connected to said indicator driver means for receiving said activation signals.

7. The invention of claim 4 wherein said scaling control means comprises:
   a plurality of input switches connected to said custom gate array means for selecting one of a plurality of predetermined output data sets stored in said programmable read only memory to be accessed by activation of said input switch means.

8. The invention of claim 3 further comprising:
scaling control means for selecting a set of said predetermined data values to be retrieved by said retrieval signals to control the load control signal selected by activation of each respective one of said input switch means.

9. The invention of claim 1 wherein said control signal encoding means comprises:
parallel to serial data encoder means for receiving said parallel data signal and converting said parallel data signal to a serial data signal.

10. The invention of claim 1 further comprising:
manually operable on-off switch means connected to said relay means to control said relay means to be in the on position when said on-off switch is in the on position and in the off position when said on-off switch is in the off position.

11. The invention of claim 1 wherein said transmitter means comprises:
resonant circuit means having a resonant frequency substantially higher than the a-c frequency of said a-c power source;
frequency shift key means connected to said resonant circuit means for varying the resonant frequency of said resonant circuit means in response to said multiple-bit serial data signal; and
signal coupling means electromagnetically coupled to said resonant circuit means for applying an a-c electrical signal having a frequency equal to that of said resonant circuit means to said a-c power line.

12. The invention of claim 11 further comprising:
filter circuit means connected electrically in series with said relay means or said power line for blocking transmission of said load control signal upstream on toward said a-c power line.

13. The invention of claim 12 wherein said filter circuit means comprises:
a parallel combination including a second capacitor means and a second inductor connected electrically in parallel and the combination being connected electrically in series with said power line; the values of said second capacitor means and said second inductor means being selected to produce resonance at said second predetermined frequency.

14. The invention of claim 13 wherein said second inductor means is connected to said power line downstream of between said filter circuit means.

15. The invention of claim 11 wherein said resonant circuit means comprises:
a first capacitor means connected electrically in parallel with a first inductor means whose values are selected to produce resonance at a frequency of about 125 kilohertz.

* * * * *